Sept. 24, 1963 M. A. PRETCEILLE 3,105,202

AMPLIFIER WITH REGULATED OUTPUT LEVEL

Filed Feb. 27, 1962 2 Sheets-Sheet 1

United States Patent Office 3,105,202
Patented Sept. 24, 1963

3,105,202

AMPLIFIER WITH REGULATED OUTPUT LEVEL

Maurice Armand Pretceille, Conflans-Sainte-Honorine, France, assignor to Lignes Telegraphiques & Telephoniques, Paris, France Filed Feb. 27, 1962, Ser. No. 175,921
Claims priority, application France May 25, 1961
4 Claims. (Cl. 330—84)

Figure 1:
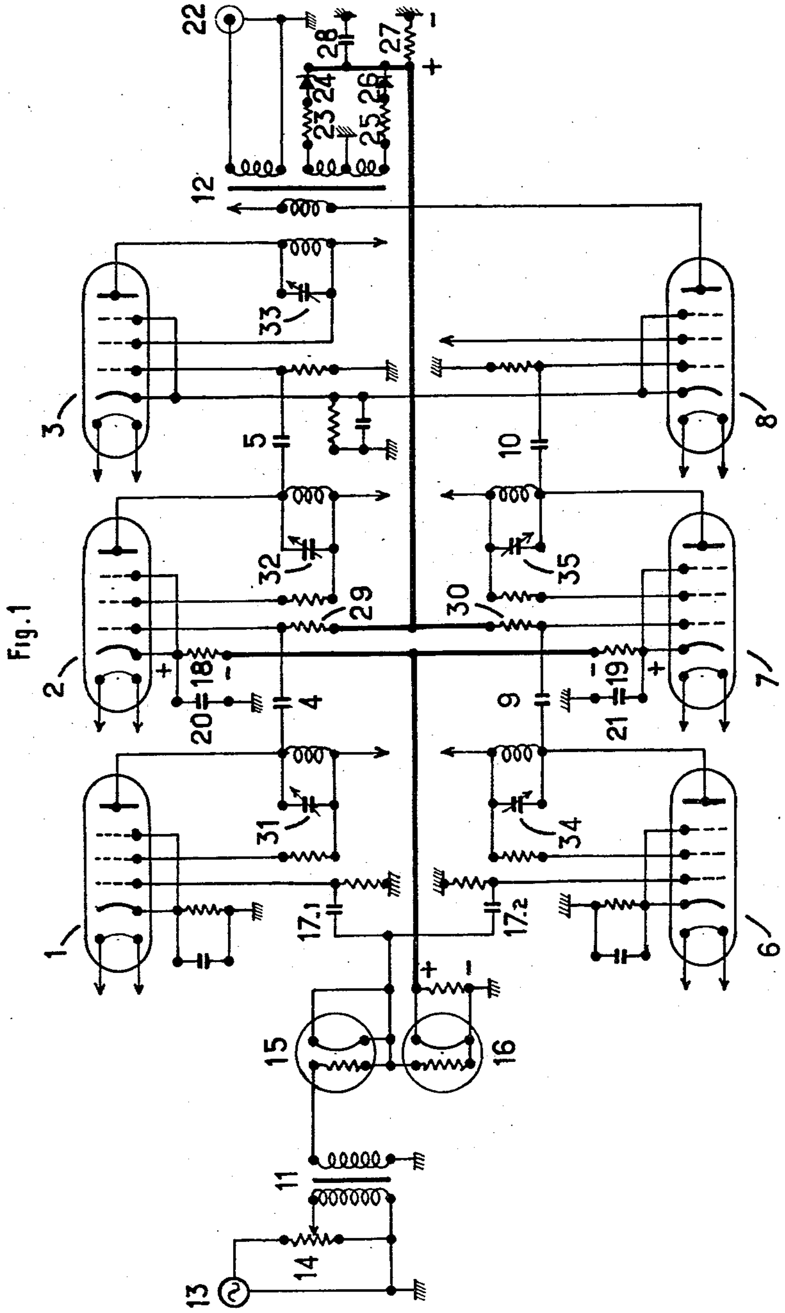

The present invention relates to electron tube amplifiers the output level of which must be kept within comparatively narrow limits and using resistances with a negative temperature coefficient, also called thermistors. The thermistors used are indirectly heated thermistors, the heater of which is current-supplied in such a way that the resistance value of the heated element varies as a function of the output level of the amplifier. The resulting variation of said value is used for varying the gain of the amplifier in such a way as to keep said output level within the prescribed limits.

The device of the invention is more particularly adapted to amplifiers operating at a single frequency, such as those employed in carrier current telecommunication systems for the transmission of a pilot signal. However, the device of the invention could also be used in a wide-band amplifier, provided a single frequency pilot signal be included in the transmitted signals. The device of the invention would then operate with respect to the output level of said single frequency signal, separated from other signals by suitable selective means.

The invention may also be applied to an amplifier with one or several amplification stages, in which it is desired to compensate for the level variations of the output signal due to changes in its input signal level, as well as to other causes, such as gain variations of the amplifier proper. The device of the invention is of special interest when it is applied to amplifiers of a well-known type in which two parallel amplification paths are provided, with a single input transformer and a single output transformer, but with separate current supplies for the heaters and for the anodes of the tubes pertaining to one and the other of said paths. In the latter case, it is generally desired that the output level of the amplified signal be kept at a practically constant value, even in the event of failure of one of the current supply sources or one of the tubes.

Various regulation systems using thermistors are already known. In such a known system, a voltage divider consisting of two series-connected thermistors is shunted across one winding of the input transformer of the amplifier, while at least one of the heaters of said thermistors is power-supplied from a rectified current directly derived from the amplifier's output. A drawback of this arrangement is that a noticeable fraction of the signal output power is absorbed in the regulating system, for instance 25 milliwatts for an amplifier of a commercial type. In the system of the invention, this drawback is obviated, since the power taken from the output of the amplifier for the operation of the regulating system does not exceed a few milliwatts.

According to the invention, there is provided an electron tube amplifier having one or several amplification stages, including an input transformer having a primary winding and a secondary winding, an output transformer provided with primary and secondary windings and with a supplementary winding for operating the regulation system, at least one indirectly heated thermistor the thermosensitive element of which is in parallel connection with the secondary winding of said input transformer and the heater element of which is fed from the cathode current of at least one of the amplifying tubes, the control grid of said tube or tubes being submitted to a rectified voltage obtained from said supplementary winding of said output transformer. The intensities of the cathode currents of said tube or tubes are thus caused to vary according to the variation of their total bias voltage, which is equal to the sum of the voltage drop in the cathode resistor (or resistors) of the tubes and of said rectified voltage, the latter of which is a function of the signal output level. A corresponding variation of the resistance of the heated element results therefrom, which in turn causes the signal voltage applied to the control grid of the first amplification stage to vary and consequently tends to regulate the output level of the amplifier.

Figure 2:
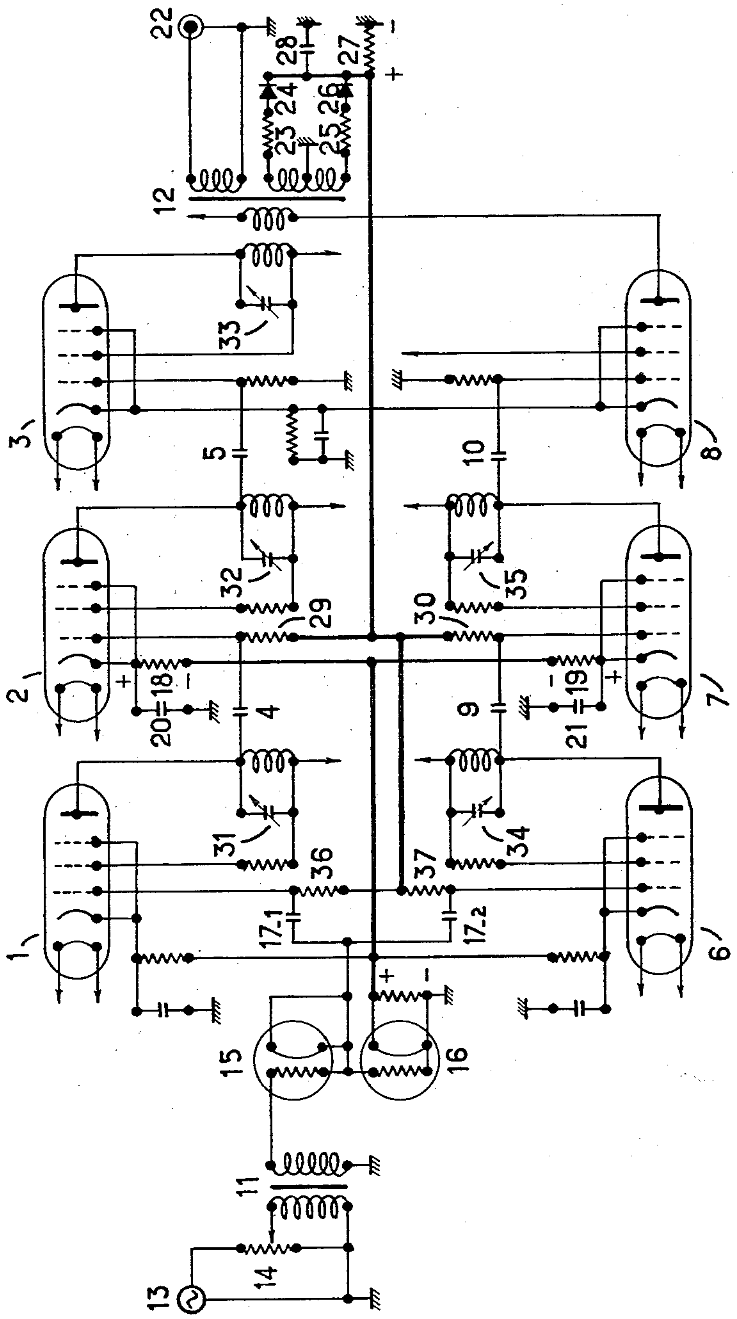

The invention will be better understood from the hereinafter given detailed description, made in connection with the annexed drawing, of which FIGS. 1 and 2 show two variants of embodiment of the invention.

It is pointed out that the amplifiers herein considered, by way of example, are of the kind known in communication technique as "tertiary group" amplifiers, i.e. amplifiers for a standard 300-channel carrier current telephone system.

Referring now to FIG. 1, the amplifier shown in this figure includes two parallel amplification paths, each with three stages; the first path comprises tubes 1, 2 and 3, with interstage coupling condensers 4 and 5; the electron tubes 6, 7 and 8 and condensers 9 and 10 play the corresponding parts in the second path.

The input transformer 11 and the output transformer 12 are common to both amplification paths. In FIG. 1, it has been assumed that all tubes are pentodes, but triodes could as well be used.

A single frequency signal delivered by a generator, schematically shown at 13, is applied through the voltage divider 14 to the primary winding of 11; across the secondary winding of 11 is connected the series assembly of the heated elements of thermistors 15 and 16.

The common point to the latter element is connected through condenser $17_1$ to the control grid of the first tube 1 of the first amplification path and also through condenser $17_2$ to the control grid of the first tube 6 of the second amplification path. The signal from 13 is thus applied to both control grids.

The heater of thermistor 15 is not used. The latter thermistor has for its purpose to keep the voltage dividing ratio of the above-said assembly at a constant value notwithstanding ambient temperature variations.

On the contrary, the heater of 16 is power-supplied from the output of the amplifier in a manner which will be explained later on; as the resistance temperature coefficient of the heated element of 16 is negative, a regulating effect takes place, since the resistance of said heated element decreases when the output level of the amplifier increases.

The heater of 16 is current-fed from the cathode currents of tubes 2 and 7 of the second stage of each amplification path, with the cathode resistors 18 and 19 and said heater series-connected between a common ground point and the cathodes of tubes 2 and 7. The cathodes of 2 and 7 are grounded for the signal frequencies by condensers 20 and 21, respectively.

The cathode currents of tubes 2 and 7 are caused to vary by changes occuring in the value of their grid bias voltage. This bias voltage is the sum of a first D.C. voltage, equal to the voltage drop caused by the D.C. anode current of the tubes across 18 or 19, and of a second D.C. voltage, obtained from the output of the amplifier through a suitable rectifying system.

To this effect, the output transformer 12 is provided, in addition to its normal primary and secondary windings (the latter of which is connected to the coaxial output terminals 22), with an extra winding the midpoint of which is grounded. The ends of said extra winding are connected, through resistor 23 and rectifier 24 on one hand, and through resistor 25 and rectifier 26 on the other hand, to a common conductor, which in turn is connected on one hand to ground through resistor 27, by-passed for signal frequencies by condenser 28, and on the other hand to the control grid of tubes 2 and 7 through resistors 29 and 30, respectively. Parallel tuned circuits tuned to the frequency of the signal to be amplified are shown at 31, 32, 33, 34 and 35, to improve the gain of the stages and also to act as selective means for said frequency.

If the signal level at the output of the amplifier decreases, the rectified voltage transmitted to the control grids of 2 and 7 from the common conductor connected to the above-mentioned common point to 24, 26, 27 and 28 also decreases. As rectifiers 24 and 26 are so poled as to make this rectified voltage positive with respect to ground, the mean anode currents of tubes 2 and 7 also decrease, which causes the resistance of the heated element of thermistor 16 to increase. Consequently the signal voltage applied to the control grids of 1 and 6 increases, which in turn causes the output level of the amplified signal to increase and to be brought back towards the desired normal value. If the signal output level increases, currents and voltages vary in the opposite direction, always tending to bring the output level back to its normal value.

FIG. 2 shows another embodiment of the invention, applied to an amplifier of a type similar to that of FIG. 1. The same reference numbers have been used in both figures for the corresponding elements. In FIG. 2, the heater of thermistor 16 is power-supplied from the cathode currents of tubes 1 and 6 of the first stage of each amplification path, as well from the cathode currents of tubes 2 and 7 of the second stage. The rectified voltage obtained through the rectifying assembly 23, 24, 25, 26 from the output transformer 12 is applied to the grid controls of all of the four just-mentioned tubes, through resistors 29, 30, 36 and 37 respectively.

Amplifiers built according to the invention have been found to satisfactorily yield the results aimed at. For instance, for an amplifier whose output voltage level across an output impedance of 75 ohms is 7.4 decibels (referred to the conventional zero level of 0.775 volt) and the normal gain of which is 39 decibels, the following results have been obtained:

Cutting off the power supply of either amplification paths (heater or anode voltage) does not cause an output level change greater than one decibel.

Removing one tube, for instance for inspection or replacement, does not cause an output level change greater than two decibels.

A four-decibel variation of the input signal level does not cause an output level change greater than one decibel.

What is claimed is:

1. An electron tube amplifier having a plurality of amplifier stages and an output stage, each of which includes at least one electron tube having an anode, a cathode and a control grid, comprising an input transformer having a primary winding and a secondary winding, an output transformer having a winding fed from the anode current of the tubes of said output stage and at least one further winding, means for applying signals of a given frequency to be amplified to said primary winding, first and second thermistors each having a heater element and a heated thermosensitive element, a series connection between the heated elements of said thermistors, connections for connecting the series circuit constituted by said series-connected heated elements across said secondary winding, means for applying signal voltage developed across the heated element of said second thermistor to the control grid of at least one of said tubes, a ground point, rectifiers fed from the signal voltage developed across said further winding of said output transformer, means for applying rectified voltage delivered by said rectifiers between said ground point and the control grid of at least part of said tubes, and circuit means respectively connecting one end of the heater element of said second thermistor to said ground point and the other end of latter said heater element to the cathodes of said part of said tubes.

2. An amplifier as claimed in claim 1, comprising two parallel amplification paths having a common input transformer and a common output transformer.

3. An amplifier as claimed in claim 2, wherein said rectified voltage is applied to the control grids of at least one tube in one of said amplification paths and one tube in the other of said paths, and wherein said circuit means comprise a plurality of resistors respectively connecting said other end of said heater element of said second thermistor to the cathodes of latter said tubes.

4. An amplifier as claimed in claim 1, wherein tuned circuits tuned to said given frequency are provided in the anode circuit of at least one of the electron tube stages of said amplifier.

References Cited in the file of this patent

UNITED STATES PATENTS

| | | |
|---|---|---|
| 2,250,581 | Heinecke | July 29, 1941 |
| 2,572,108 | Chalhoub | Oct. 23, 1951 |